No. 769,965. Patented September 13, 1904.

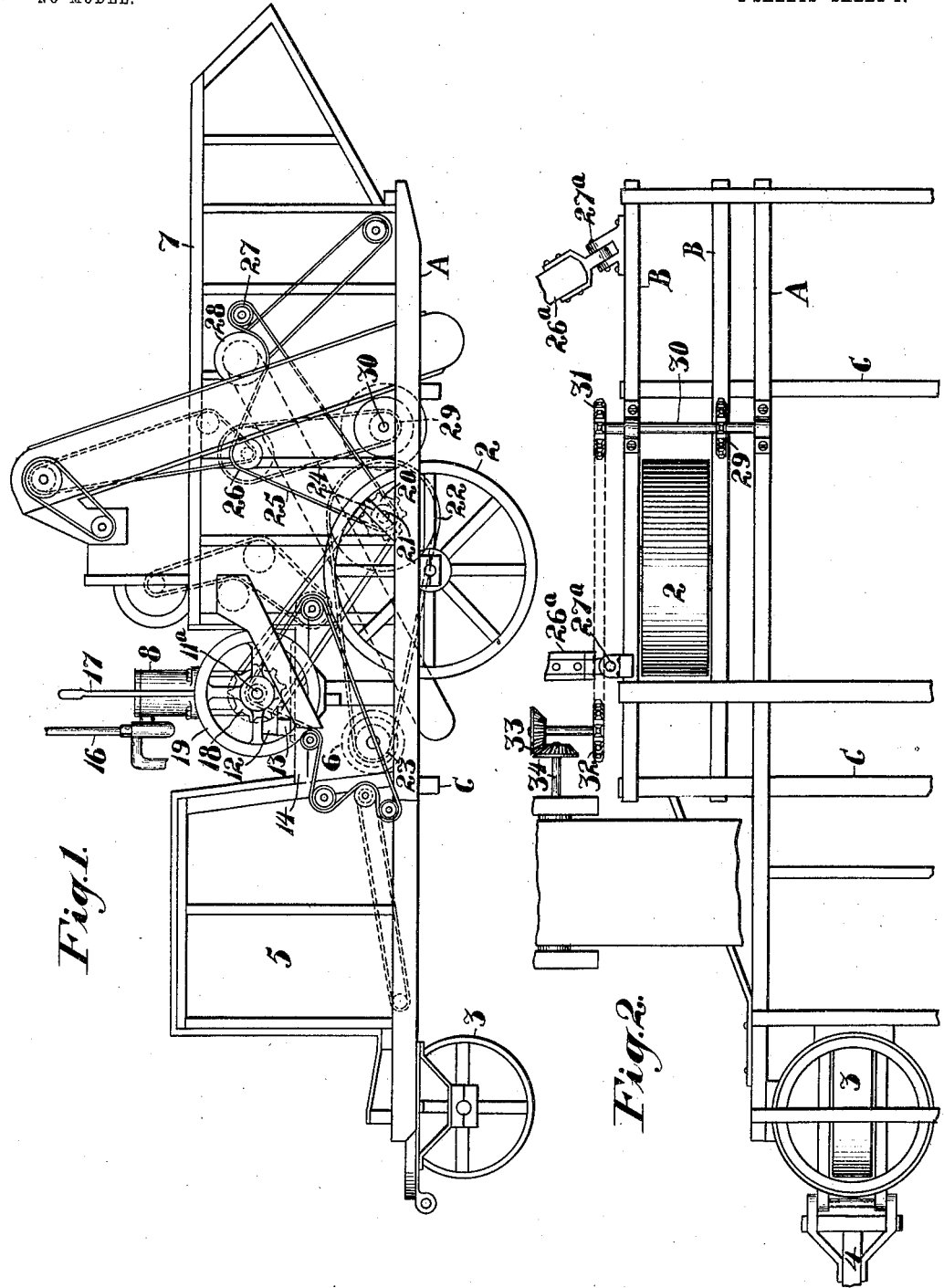

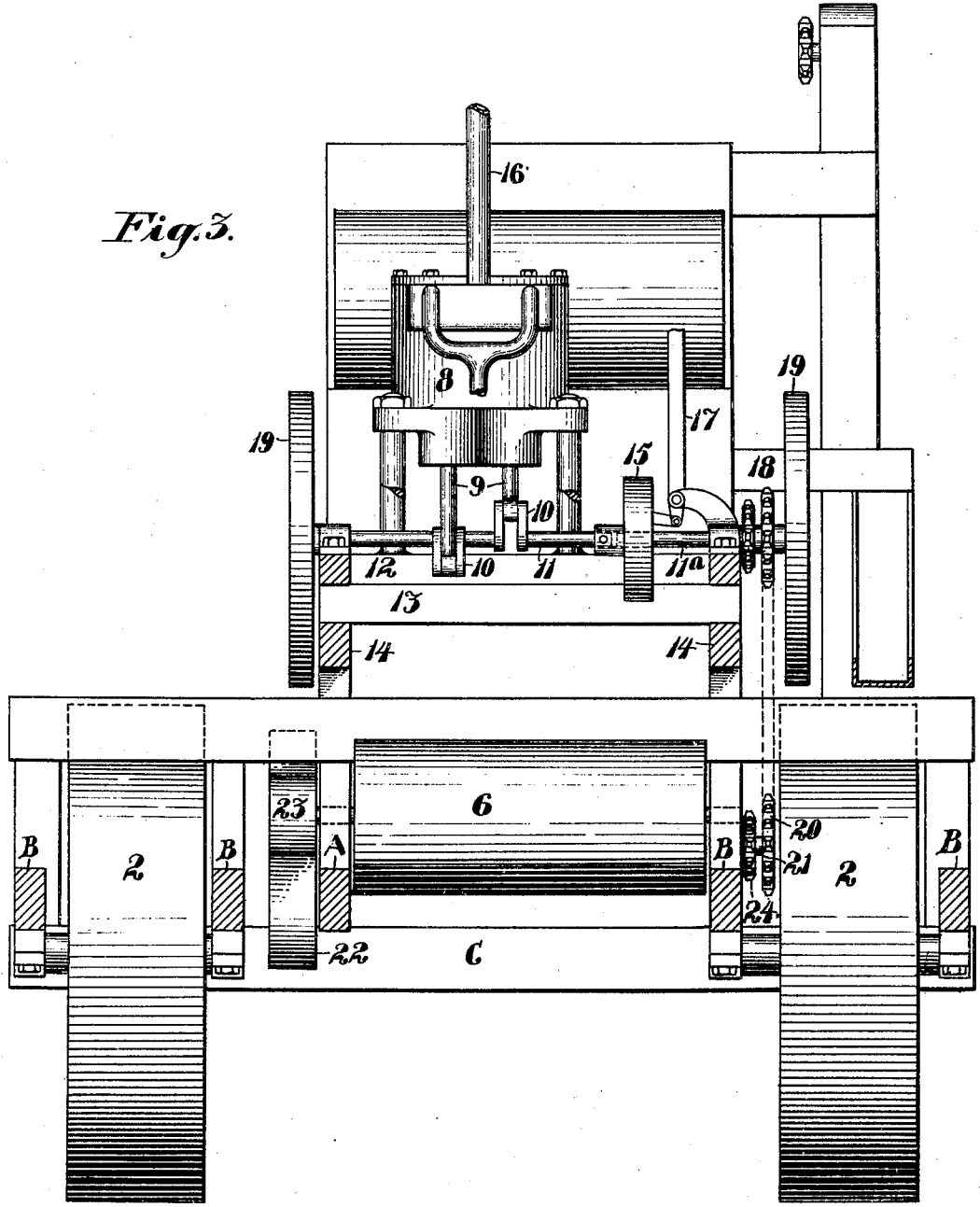

UNITED STATES PATENT OFFICE.

JAMES TRETHEWEY, OF STOCKTON, CALIFORNIA, ASSIGNOR TO THE HARRIS MANUFACTURING COMPANY, OF STOCKTON, CALIFORNIA, A CORPORATION OF CALIFORNIA.

TRAVELING HARVESTER.

SPECIFICATION forming part of Letters Patent No. 769,965, dated September 13, 1904.

Application filed March 29, 1904. Serial No. 200,534. (No model.)

*To all whom it may concern:*

Be it known that I, JAMES TRETHEWEY, a citizen of the United States, residing at Stockton, in the county of San Joaquin and State of California, have invented new and useful Improvements in Traveling Harvesters, of which the following is a specification.

My invention relates to improvements in harvesting machinery of that class which is designed to cut, thresh, and clean grain during the travel of the machine over the field.

My invention consists in the combination of parts including a gasolene-engine by which the cutting, threshing, and cleaning mechanism are driven while the machine is hauled over the ground by separate and independent power, and in details of construction which will be more fully explained by reference to the accompanying drawings, in which—

Figure 1 is a side elevation. Fig. 2 is a plan view of the frame. Parts of same are broken away. Fig. 3 is a transverse section of my apparatus.

In the operation of machines of the class herein described it is common to haul such machines over the field either by large teams of horses or by traction-engines, and the power to drive the sickle, the transporting belt or draper, and the threshing and cleaning mechanism is generally derived from the main bearing-wheels, which depend on their traction moving over the ground to provide such power. In some cases steam-engines have been mounted upon one side or upon the forward end of the harvester and so disposed as to do a portion of the work; but it has been necessary to mount the engine upon such portion of the machine as to make an objectionable weight and strain upon the machine.

It is the object of my invention to apply the power of a plurality of internal-combustion engines which are centrally located and with such relation to the main bearing-wheels as to assist in counterbalancing the weight of the machine, and by means of supporting-girders extending across the machine the engine is centrally located approximately above the threshing-cylinder and in position to transmit its power to best advantage to all parts which are to be driven by the engine.

As shown in the accompanying drawings, A represents the main longitudinal sills of the harvester.

B represents the longitudinal wheel-frame timbers, which are carried by transverse timbers C, extending across the machine in the usual manner for such frames.

2 represents the main bearing-wheels.

3 is a steering-wheel journaled so as to be turnable, and 4 is a draft-pole or equivalent attachment or connection to whatever power may be applied to haul the machine. This power is only designed to haul the machine over the field, and I have not here shown any portion of the power for driving the internal machinery as derived from the traction-wheels.

The superstructure of the machine consists of what is termed the "feed-house" 5, into which the cut straw and grain are delivered from the header portion of the apparatus, and from this feed-house the grain is delivered by a suitable well-known mechanisn (not here shown) to the threshing-cylinder, which is located at 6.

The portion of the superstructure containing the threshing-cylinder is lower than the feed-house and lower than the rear portion 7 of the superstructure, within which latter portion are contained the carrying-belts which transmit the threshed straw and grain from the cylinder, the cleaning-shoes upon which the grain and chaff are deposited, and the straw-carrier by which the majority of the larger straw is delivered out of the rear of the machine, together with beaters and other adjuncts.

In order to drive the various internal mechanism of this apparatus, I employ an internal-combustion engine, which by reason of the nature of its operation is not a source of danger by igniting the combustible straw and chaff by which it is surrounded. Such an engine I have shown at 8. In the present case I have shown a plurality of cylinders having connecting-rods 9 to the cranks 10 of the crank-shaft 11. This engine is preferably set over the lower part of the superstructure previously described in which the threshing-cylinder is contained, and is thus located very close to the main bearing-wheels 2, and being also located substantially central between these wheels transversely it is strongly supported and the vibration of its operation will not be injuriously transmitted to the frame and other parts of the machine.

In order to properly support the engine, I have shown an iron bed-plate 12 extending above the superstructure of the machine at the point designated, and this plate is in turn supported upon transversely-disposed beams or girders 13, these latter in turn resting upon the longitudinal side timbers 14 of this portion of the machine.

The engine-shaft 11 is suitably journaled with relation to the bed-plate 12, and by means of any suitable or well-known clutch mechanism, as at 15, the engine-shaft may be connected with the shaft 11ª, which is in line with the engine-shaft and through which power is transmitted to the other parts of the apparatus.

The gasolene-supply tank may be located upon the feed-house. The water-tank for circulating cooling-water may also be located, for instance, in front of the said feed-house, and the battery for ignition purposes may be located at one side of the feed-house; but the location of these parts is not important and would be a matter of convenience.

The exhaust-gases may be delivered directly upward from the engine by means of a discharge-pipe, as at 16.

The clutch 15 is operated by means of a lever, as at 17, and when the engine is connected power is transmitted to drive the sprocket or equivalent wheel 18.

19 represents balance-wheels upon the engine-shaft.

From the sprocket-wheel 18 power is transmitted by chain to the sprocket-wheel 20 upon a shaft 21. This shaft 21 extends across the machine to the opposite side and has fixed upon it at that side a pulley 22, from which a belt passes to the pulley 23, fixed to the shaft of the threshing-cylinder 6.

Thus power is transmitted to drive that portion of the machine which requires the greatest amount of power, the engine being located in close proximity to the cylinder, and only so many transmissions are made as will be necessary to give the requisite speed to the threshing-cylinder.

24 is another sprocket carried upon the shaft 21, and here shown as by the side of sprocket 20. From this sprocket a chain, as 25, passes up over pulleys, as 26 27 28, and through these pulleys the carriers, beaters, and various internal portions not here fully described may be driven. The header-frame 26ª is hinged to the outer timbers upon the right wheel-frame of the thresher, as shown at 27ª.

Power is transmitted to drive the sickle and draper by chain from the sprocket-wheel 29, fixed upon a counter-shaft 30, having a sprocket-wheel 31 upon its opposite end and exterior to the wheel-frame. A chain from this sprocket-wheel passes around the sprocket 32, the shaft of which is journaled upon the header-frame, and by means of a bevel-gear, as at 33, power is transmitted through a shaft 34 to operate the sickle-driving crank and the draper or carrier by which the grain is delivered into the feed-house.

Having thus described my invention, what I claim, and desire to secure by Letters Patent, is—

1. The combination in a traveling harvester having a superstructure with a depressed portion overlying the threshing-cylinder, threshing and cleaning mechanism, bearing and steering wheels, draft connections, a headed portion hinged to the thresher, an internal-combustion engine supported upon said depressed portion of the superstructure substantially midway between the sides of the machine, and sprockets, pulleys and connecting-belts whereby motion is transmitted from the engine to the cutting, threshing, and cleaning devices.

2. In a traveling thresher the combination with threshing and cleaning mechanism, the bearing-wheels, draft connection, a header portion, and a superstructure inclosing the threshing and cleaning mechanisms said superstructure having a depressed portion overlying the threshing-cylinder, of transverse girders mounted upon said depressed portion of the superstructure, a bed-plate secured to said girders, an engine-frame secured to the bed-plate centrally between the sides of the machine, sprockets and pulleys and belts whereby motion is transmitted from the engine to the cutting, threshing and cleaning devices independent of the propelling mechanism.

3. A traveling harvester having in combination a frame including a superstructure with a depressed portion surmounting the threshing-cylinder; a header; bearing and steering wheels; a draft attachment; threshing and cleaning mechanisms; supporting-girders on the depressed portion of the superstructure above the threshing-cylinder; an engine bed-plate mounted on the girders; an internal-combustion engine secured to the bed-plate centrally between the sides of the machine; a transmission-shaft in line with the engine-shaft, and a clutch between said shafts; and sprockets, pulleys and connecting-belts by which motion is transmitted to the threshing and cleaning mechanisms and to the header.

In testimony whereof I have hereunto set my hand in presence of two subscribing witnesses.

JAMES TRETHEWEY.

Witnesses:
S. H. NOURSE,
JESSIE C. BRODIE.